(12) United States Patent
Jonsson et al.

(10) Patent No.: US 12,412,438 B2
(45) Date of Patent: Sep. 9, 2025

(54) BEACON CIRCUIT FOR USE WITH ELECTRONIC LOCKS

(71) Applicant: ASSA ABLOY AB, Stockholm (SE)

(72) Inventors: Tomas Jonsson, Rönninge (SE); Fredrik Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 230 days.

(21) Appl. No.: 17/424,804

(22) PCT Filed: Feb. 12, 2020

(86) PCT No.: PCT/EP2020/053627
§ 371 (c)(1),
(2) Date: Jul. 21, 2021

(87) PCT Pub. No.: WO2020/165269
PCT Pub. Date: Aug. 20, 2020

(65) Prior Publication Data
US 2022/0092896 A1    Mar. 24, 2022

(30) Foreign Application Priority Data

Feb. 15, 2019 (SE) .................................. 1950192-3

(51) Int. Cl.
*G07C 9/00* (2020.01)
*G01S 1/02* (2010.01)
*G01S 5/02* (2010.01)

(52) U.S. Cl.
CPC ............ *G07C 9/00182* (2013.01); *G01S 1/02* (2013.01); *G01S 5/02* (2013.01); *G07C 9/00309* (2013.01);
(Continued)

(58) Field of Classification Search
CPC ............ G07C 9/00182; G07C 9/00309; G07C 2009/00341; G07C 2009/0038; G01S 1/02; G01S 5/02
See application file for complete search history.

(56) References Cited

U.S. PATENT DOCUMENTS

2010/0035629 A1   2/2010   Soliman
2011/0115605 A1*   5/2011   Dimig .................. H02J 50/001
                                      340/5.61

(Continued)

FOREIGN PATENT DOCUMENTS

CN   102193081   9/2011
CN   105530589   4/2016
(Continued)

OTHER PUBLICATIONS

Official Action for Sweden Patent Application No. 1950192-3, dated Aug. 19, 2019, 9 pages.
(Continued)

*Primary Examiner* — Nabil H Syed
(74) *Attorney, Agent, or Firm* — Schwegman Lundberg & Woessner, P.A.

(57) ABSTRACT

It is provided a beacon circuit for use with electronic locks. The beacon circuit comprises a transmitter. The beacon device is configured to repetitively transmit a beacon signal to initiate subsequent communication with a receiver. The energy use for the beacon signal employs a communication channel which consumes less power than a communication channel for the subsequent communication. The beacon signal comprises an indication of time of the subsequent communication.

21 Claims, 3 Drawing Sheets

(52) U.S. Cl.
CPC ............. *G07C 2009/00341* (2013.01); *G07C 2009/0038* (2013.01)

(56) References Cited

U.S. PATENT DOCUMENTS

| | | | |
|---|---|---|---|
| 2014/0329536 A1 | 11/2014 | Tian et al. | |
| 2017/0041886 A1 | 2/2017 | Baker et al. | |
| 2017/0148243 A1 | 5/2017 | Shin et al. | |
| 2017/0236346 A1* | 8/2017 | Murar | G07C 9/28 340/5.61 |
| 2018/0005470 A1* | 1/2018 | Stephens | G07C 9/00309 |
| 2018/0035245 A1* | 2/2018 | Thanayankizil | H04W 4/44 |
| 2018/0077702 A1* | 3/2018 | Mclellan | H04J 11/0086 |
| 2018/0151008 A1 | 5/2018 | Dehnert et al. | |
| 2018/0154866 A1* | 6/2018 | Sute | H02J 50/12 |
| 2018/0162321 A1* | 6/2018 | Spiess | G07C 9/00309 |
| 2018/0249313 A1 | 8/2018 | She et al. | |
| 2018/0270753 A1 | 9/2018 | Recker et al. | |
| 2019/0032391 A1 | 1/2019 | Lavoie et al. | |
| 2019/0373639 A1* | 12/2019 | Elliott | H04W 76/15 |
| 2020/0100283 A1* | 3/2020 | Naguib | H04W 56/001 |

FOREIGN PATENT DOCUMENTS

| | | | |
|---|---|---|---|
| CN | 106303919 | 1/2017 | |
| CN | 106537884 | 3/2017 | |
| EP | 2584540 | 4/2013 | |
| EP | 3335942 | 6/2018 | |
| FR | 3026212 A1 * | 3/2016 | ............ B60R 25/01 |
| KR | 20170058786 A * | 5/2017 | |
| KR | 10-1861057 | 5/2018 | |
| WO | WO-2018081894 A1 * | 5/2018 | ...... H04W 12/00512 |

OTHER PUBLICATIONS

International Search Report and Written Opinion for International (PCT) Patent Application No. PCT/2020/053627, dated Apr. 28, 2020, 11 pages.

English Translation of Official Action for China Patent Application No. 202080014388.4, dated Jul. 29, 2022, 12 pages.

"CN 202080014388.4 Decision of Rejection mailed Sep. 20, 2023", with English translation, (Sep. 20, 2023), 16 pages.

"EP 20705173 1 Communication pursuant to Article 94 3 EPC mailed Jul. 23, 2024", 6 pages.

* cited by examiner

BEACON CIRCUIT FOR USE WITH ELECTRONIC LOCKS

CROSS REFERENCE TO RELATED APPLICATIONS

This application is a national stage application under 35 U.S.C. 371 and claims the benefit of PCT Application No. PCT/EP2020/053627 having an international filing date of Feb. 12, 2020, which designated the United States, which PCT application claimed the benefit of Sweden Patent Application No. 1950192-3 filed Feb. 15, 2019, the disclosure of each of which are incorporated herein by reference.

TECHNICAL FIELD

The present disclosure relates to a beacon circuit for use with electronic locks.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface, such as UWB (Ultra-Wideband). Such electronic locks provide a number of benefits, including improved flexibility in management of access rights, audit trails, key management, etc.

SUMMARY

One objective is to improve power efficiency for beacon signals employed for electronic locks.

According to a first aspect, it is provided a beacon circuit for use with electronic locks. The beacon circuit comprises a transmitter. The beacon circuit is configured to repetitively transmit a beacon signal to initiate subsequent communication with a receiver. The energy use for the beacon signal employs a communication channel which consumes less power than a communication channel for the subsequent communication. The beacon signal comprises an indication of time of the subsequent communication.

The communication for the subsequent communication may be based on ultra-wideband, UWB, while the communication channel for the beacon signal may be more narrowband than UWB.

The beacon signal may comprise an identity of the device of the beacon circuit.

The beacon signal may comprise communication capabilities supported by the device of the beacon circuit.

The capabilities may comprise any one or more of supported bitrate(s), supported frequencies, supported communication protocol(s), supported communication protocol version(s).

The beacon signal may comprise a slot rate for the subsequent communication.

The beacon signal may comprise connection data that is usable for establishing the communication channel for the subsequent communication.

The connection data may comprise an identifier of a network to use for the communication channel for the subsequent communication The beacon signal may be encrypted.

The beacon signal may comprise a password for the network to use for the subsequent communication. In this case, the beacon signal can be encrypted, to protect the password.

According to a second aspect, it is provided an access control device comprising the beacon circuit according to the first aspect.

According to a third aspect, it is provided a key device comprising the beacon circuit according to the first aspect.

The key device may form part of a smartphone.

According to a fourth aspect, it is provided a method for providing a beacon signal. The method comprising the step of: repetitively transmitting a beacon signal to initiate subsequent communication with a receiver. The energy use for the beacon signal employs a communication channel which consumes less power than a communication channel for the subsequent communication. The beacon signal comprises an indication of time of the subsequent communication.

The method may further comprise the step of: establishing the subsequent communication in correspondence with the indication of time.

The communication for the subsequent communication may be based on ultra-wideband, UWB, while the communication channel for the beacon signal may be more narrowband than UWB.

The beacon signal may comprise an identity of the device of the beacon circuit.

The beacon signal may comprise communication capabilities supported by the device of the beacon circuit.

The capabilities may comprise any one or more of supported bitrate(s), supported frequencies, supported communication protocol(s), supported communication protocol version(s).

The beacon signal may comprise connection data that is usable for establishing the communication channel for the subsequent communication.

The connection data may comprise an identifier of a network to use for the communication channel for the subsequent communication The beacon signal may be encrypted.

The beacon signal may comprise a password for the network to use for the subsequent communication. In this case, the beacon signal can be encrypted, to protect the password.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Low Power Applications

Figure 1:
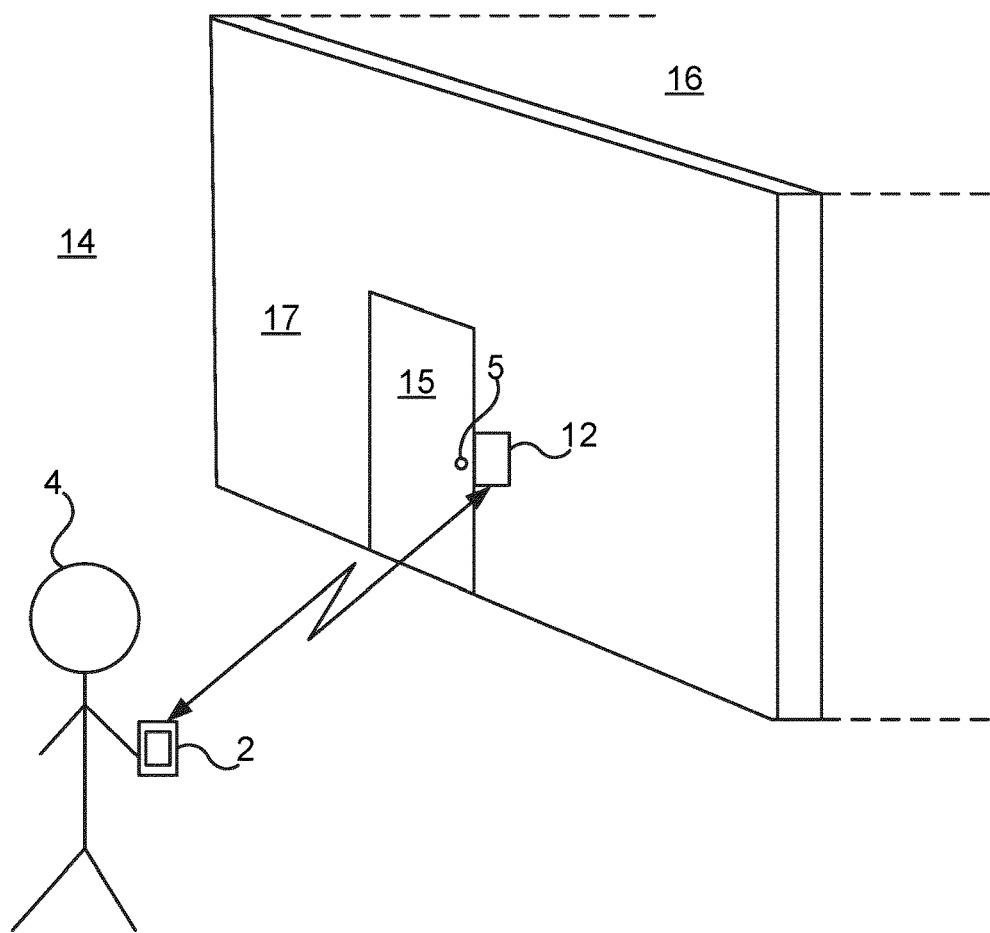
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. In order to control access to the physical space 16, by selectively unlocking the barrier 15, an access control device 12 is provided. The access control device 12 comprises an electronically controllable lock.

The access control device 12, also known as an electronic lock, can be provided in the structure 17 surrounding the barrier 15 (as shown) or the access control device 12 can be provided in the barrier 15 itself (not shown). The access control device 12 is controllable to be in a locked state or in an unlocked state.

A user 4 carries a key device 2. The key device 2 can be embodied using a smartphone, fob, etc. The access control device 12 communicates with the key device 2 to determine whether to grant access (thereby unlocking the door) or not to grant access (thus keeping or assuming a locked state). The communication can e.g. be based i.a. on UWB or WiFi.

The access control device 12 can be connected to an external power source or is battery powered. When the access control device 12 is battery powered, power consumption is of utmost priority, since the access control device 12 needs to be able to communicate with a key device 2 at any time. Moreover, this embodiment should not require the user to take the key device 2 out of a pocket/hand bag for the access control to occur.

In order to enable the communication but to reduce power requirements, a beacon circuit is provided. The beacon circuit is a circuit which regularly transmits a beacon, being a signal allowing a receiver to detect the presence of the transmitter of the beacon signal and proceed with communication setup. The beacon signal can have a limited range, to save power and to have stricter control of the location of a receiver that can detect the beacon signal. The beacon circuit is also known as a pinger circuit. The beacon circuit should not be confused with a device commonly known as a BLE beacon, which is a different type of device. The subsequent communication (after the beacon signal is received) can e.g. be based on UWB (Ultra-WideBand), e.g. any of the IEEE 802.15 standards or WiFi (any of the IEEE 802.11 standards). Alternatively or additionally, the subsequent communication is based on any other suitable wireless communication protocol such as BLE (Bluetooth Low Energy).

The beacon circuit can be provided in the access control device 12, in which case the key device 2 is the receiver. Alternatively, the beacon circuit can be provided in the key device 2, in which case the access control device 12 is the receiver.

In one embodiment, the beacon signal uses less power than transmissions using the subsequent communication, since the beacon needs to be repeated for a great number of times. For instance, when the subsequent communication is based on UWB, the beacon can be a more narrowband signal to reduce power requirements for the repetitively transmitted beacons. In other words, the energy use for the beacon signal employs a communication channel (and/or communication protocol) which consumes less power than a communication channel (and/or communication protocol) for the subsequent communication. This is particularly useful when the beacon circuit forms part of an access control device 12 which is battery powered, since battery replacements really should be avoided as much as possible.

In one embodiment, the beacon signal comprises sufficient power to activate the receiver. In this way, the receiver can be completely passive when not used, using only minimal power. The beacon signal is then powerful enough to cause the receiver to power up. This is particularly useful when the beacon circuit forms part of the key device 2, e.g. a smartphone, the battery of which is easier charged. The beacon signal is then used to power the access control device. Alternatively, this embodiment can be applied when the access control device 12 comprises the beacon circuit and is powered from an external power source (e.g. mains power), whereby the key device is powered by the beacon signal.

Optionally, the beacon signal comprises an identity of the transmitter device, i.e. the device containing the beacon circuit (the access control device or the key device).

Optionally, the beacon signal is of the same type of transmission as the subsequent transmissions, e.g. UWB.

The beacon signal comprises an indication of time of the subsequent (future) communication (transmissions). For instance, the indication of time can imply that subsequent communications commence in x ms (after transmission of the beacon signal). By providing an indication of time of subsequent communication, power is saved since the receiver already from the beacon signal can deduce when to listen for the next transmission or when to send its own transmission. The number of signals between the beacon signal/transmitter and the receiver is thus reduced. The indication of time can function as a rough time synchronisation between the beacon circuit and the receiver. Finer time synchronisation can follow at a later stage if needed.

Optionally, the beacon signal comprises a slot rate for the subsequent communication. The slot rate defines in more detail the subsequent communication. The slot rate defines a periodicity of subsequent communication that can occur with a receiver that starts communicating with the device of the beacon circuit based on receiving the beacon signal.

Optionally, the beacon signal comprises an application identifier. The application identifier is used to trigger further communication with a specific application in the key device (e.g. when implemented in smartphone). In this way, the key device triggers the application which is (directly or indirectly) mapped to the application identifier in the beacon signal to be started. The triggered application in the key device is then used for the subsequent communication to allow the access control device 12 to verify access rights for the key device.

Optionally, the beacon signal comprises supported bitrate (s), supported frequencies, supported communication protocol(s), supported communication protocol version(s) supported for the subsequent communication by the transmitter, being the device containing the beacon circuit. This allows the receiver to select a combination of parameters for subsequent communication which is supported by both the receiver and the transmitter.

Optionally, the beacon signal comprises other data that is usable for establishing the communication channel for the subsequent communication. For instance, the beacon signal can comprise an identifier of a network to use for the communication channel for the subsequent communication, e.g. SSID for a WiFi network. Moreover, the beacon signal can comprise an address for reaching the device on the communication channel for the subsequent communication This greatly simplifies the establishment of the communication channel for the subsequent communication.

Optionally, if the receiver is part of a known set of devices that all have a certain cryptographic key used for decrypting data, the beacon signal can be encrypted with that key. In such a case, the beacon signal can also comprise a password for the network to use for the subsequent communication. Hence, the communication channel can then be protected with a password, which is only provided when needed using the encrypted beacon signal.

Optionally, the beacon signal contains a data item (e.g. a flag) indicating if the recipient device should connect or not.

Optionally, the beacon circuit is integrated with a circuit used for the subsequent communication.

Using embodiments presented herein, the beacon signal is more power efficient than in the prior art. Moreover, by indicating the time of subsequent communication, power is saved. Hence, power efficiency is increased by using the beacon signal when another channel (e.g. UWB) is used for subsequent communication. This can be used for seamless entry, where a user can keep the key device hidden in a handbag or pocket when approaching a lock and the lock is unlocked without user involvement.

Venue Entrance

Figure 2:
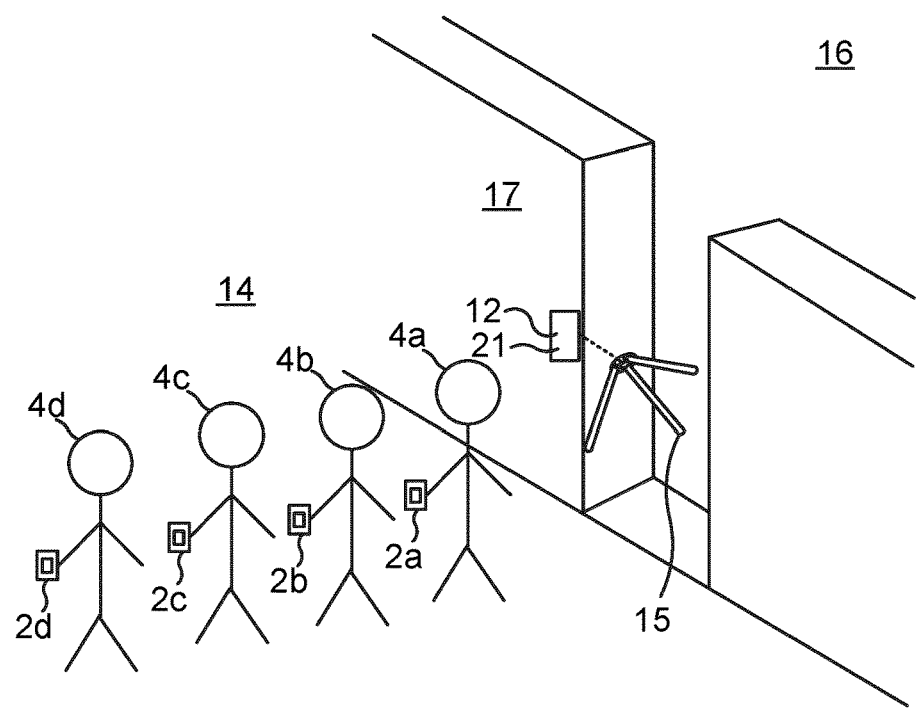
FIG. 2 is a schematic diagram showing an environment in which embodiments presented herein can be applied.

FIG. 2 is a schematic diagram showing an environment in which embodiments presented herein can be applied for venues. In this scenario, the barrier 15 is provided in a space where there are many concurrent users 4a-d with respective key devices 2a-d. This can be used e.g. for concert venues, sports venues, underground stations, etc. While not shown in FIG. 2, there can be several barriers 15 in parallel to allow more users 4a-d to enter per unit of time. When multiple barriers 15 are provided, these can be provided with respective access control devices 12. While four users 4a-d with respective key devices 2a-d are shown, any number of users and respective key devices can be present, e.g. dozens or even hundreds or more.

A first user 4a with a first key device 2a is closest to the barrier 15. However, two or more of the key devices 2a-d may be within communication range of the access control device 12. Consider a scenario where the first key device 2a should not be granted access, but the second key device 2b is to be granted access. It is thus desired that the access control device 12 only evaluates access for the first key device 2a and not of the second key device 2b.

A problem is then how the access control device 12 is able to connect to key devices which are closest, to thereby provide relevant and prompt access control to allow convenient access through the barrier(s) 15. Also, when there are a great number of key devices, it is desired to use the limited radio and processing resources to connect to the nearest key devices. Additionally, Angle of Arrival can be used to detect direction and optionally position of each key device.

In one embodiment, the range of communication from the access control device 12 is limited (e.g. by limiting transmission power or selecting an appropriate communication technology) to thereby only communicate with key devices which are closest. All other key devices are then disregarded until they come into range. The range limitation can be implemented by a beacon circuit with suitably limited transmission power.

In one embodiment, the access control device 12 assigns a time slot for subsequent communication with the key device, to reduce interference between key devices and provide more reliable communication.

Unnecessary connections from key devices far away should be avoided since that consumes radio resources and processing resources of the access control device 12.

It is also desired to handle users who experience access problems (e.g. due to issues with a ticket etc.) in a convenient way. Moreover, there should be a convenient way to manage users that bring forbidden items.

At the same time, the access control device 12 tracks the users that enter and exit, such that the number of users inside is known at all times, e.g. for emergency situations (fire, etc.).

Public Transport Ticketing

Figure 3:
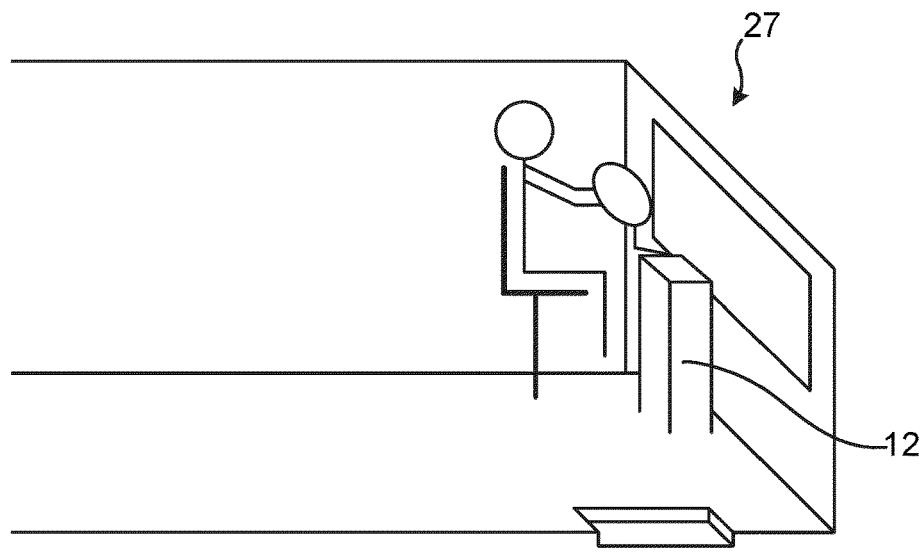
FIG. 3 is a schematic diagram showing an environment in which embodiments presented herein can be applied for public transport.

FIG. 3 is a schematic diagram showing an environment in which embodiments presented herein can be applied for public transport.

A vehicle 27, e.g. bus, tram, train, etc., has installed an access control device 12 to validate tickets, allow purchasing of tickets, etc. The access control device 12 can communicate with a key device, here in the form of a token device such as a smartcard or smartphone, allowing tickets to be presented or purchased. The access control device 12 can be limited in range to only communicate with the token device if it is within a very narrow distance (e.g. 0.5 metres or even less) of the access control device 12. The position of each token device can be determined for this to be possible.

In one embodiment, the access control device 12 also connects with an external system to validate a payment transaction with the token device.

It is to be noted that in all embodiments presented above, positioning of the key device/token device can be desired. In such positioning, positioning data can be transmitted from the key device to the access control device, to allow the access control device to position the key device, e.g. based on time of flight and/or angle of arrival. In one embodiment, the positioning data is protected. This protection can be in the form of encryption, which can be symmetric or asymmetric encryption. Alternatively or additionally, the protection is in the form of an electronic signature to certify the source. By applying protection of the positioning data, it is prevented that someone transmits illegitimate positioning data to thereby attempt to impersonate (i.e. spoof) another key device or make the access control device to determine an incorrect manipulated position of a key device.

As explained above, the beacon signal optionally comprises an application identifier. In this example, the application identifier can be used to address a public transport application in the key device (e.g. when implemented in smartphone). The public transport application is thus started and proceeds with the subsequent communication to allow the access control device 12 to verify access rights for the key device.

The access control device 12 is capable of being connected to a lot of token devices at the same time and distinguish between them depending on position.

Figure 4:
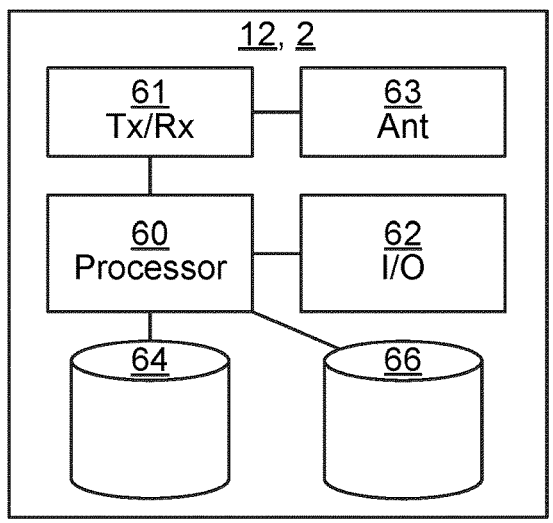
FIG. 4 is a schematic diagram illustrating components of the access control device and the key device(s) of FIGS. 1-3.

FIG. 4 is a schematic diagram illustrating components of the beacon circuit forming part of the access control device 12 and the key device(s) 2, 2a-d of FIGS. 1-3. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the procedures and actions described above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The access control device 12 and the key device(s) 2 further comprise an I/O interface 62 for communicating with external and/or internal entities. Optionally, the I/O interface 62 also includes a user interface.

A transceiver 61 comprises suitable analogue and digital components to allow signal transmission via a transmitter and signal reception via a receiver with a wireless device using one or more antennas 63. Other components of the access control device 12 and the key device(s) 2 are omitted in order not to obscure the concepts presented herein.

Figure 5:
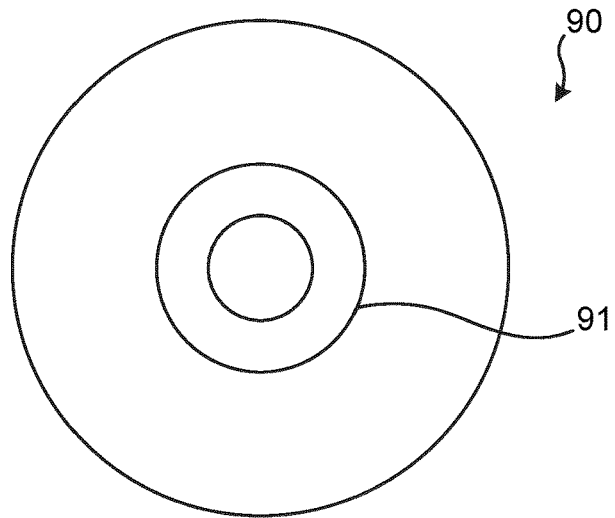
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

Figure 6A:
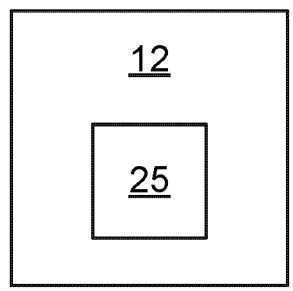
FIGS. 6A-B are schematic diagrams illustrating embodiments of where the beacon circuit can be implemented.
Figure 6B:
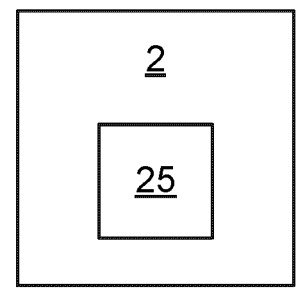

FIGS. 6A-B are schematic diagrams illustrating embodiments of where the beacon circuit 25 can be implemented.

In FIG. 6A, the beacon circuit 25 is shown as implemented in the access control device 12. The access control device 12 is thus the host device for the beacon circuit 25 in this implementation.

In FIG. 6B, the beacon circuit 25 is shown as implemented in the key device 2. The key device 2 is thus the host device for the beacon circuit 25 in this implementation.

Figure 7:
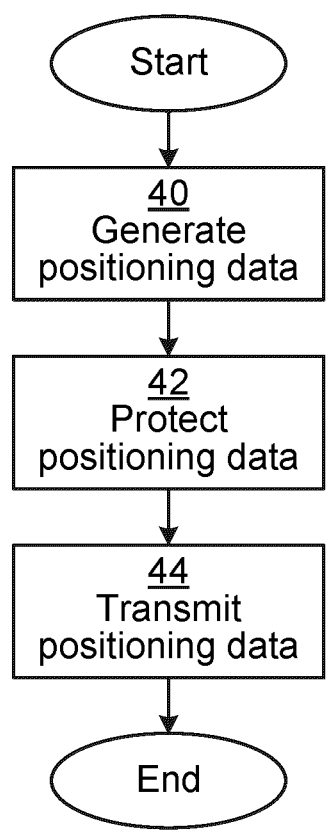
FIG. 7 is a flow chart illustrating embodiments of methods for transmitting positioning data.

FIG. 7 is a flow chart illustrating embodiments of methods for transmitting positioning data. The method being performed in a key device.

In a generate positioning data step 40, the key device generates positioning data In a protect positioning data step 42, the key device protects the positioning data, yielding protected positioning data. The protecting can comprise encrypting the protected positioning data, e.g. using symmetric encryption or asymmetric encryption. Alternatively or additionally, the protecting can comprise cryptographically signing the positioning data.

In a transmit positioning data step 42, the key device transmits the positioning data to an access control device.

Figure 8:
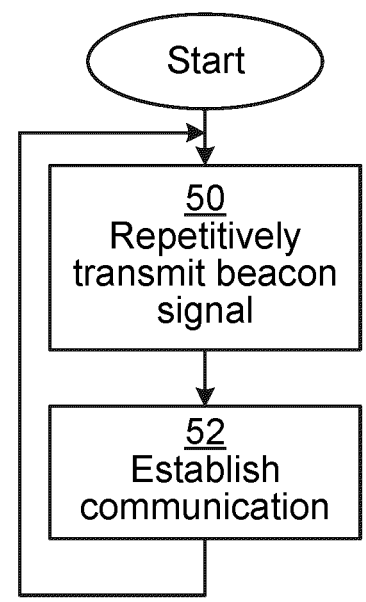
FIG. 8 is a flow chart illustrating embodiments of methods for transmitting a beacon signal.

FIG. 8 is a flow chart illustrating embodiments of methods for transmitting a beacon signal. The method is performed in the beacon circuit and/or its host device (such as the access control device or the key device).

In a repetitively transmit beacon signal step 50, a beacon signal is repetitively transmitted. The purpose of the beacon signal is to enable initiation of subsequent communication with a receiver. The energy use for the beacon signal employs a communication channel which consumes less power than a communication channel for the subsequent communication. Moreover, the beacon signal comprises an indication of time of the subsequent communication.

The communication for the subsequent communication can be based on UWB while the communication channel for the beacon signal is more narrowband than UWB.

The beacon signal can comprise an identity of the device of the beacon circuit.

The beacon signal can comprise information of communication capabilities supported by the device of the beacon circuit. The capabilities can e.g. comprise any one or more of supported bitrate(s), supported frequencies, supported communication protocol(s), supported communication protocol version(s).

In an optional establish communication step 52, the subsequent communication is established. The subsequent communication is established in correspondance with the indication of time.

Here now follows a list of embodiments from another perspective, enumerated with roman numerals.

i. A beacon circuit for use with electronic locks, the beacon circuit comprising:
  a transmitter;
  wherein the beacon device is configured to repetitively transmit a beacon signal to initiate subsequent communication with a receiver; wherein the energy use for the beacon signal employs a communication channel which consumes less power than a communication channel for the subsequent communication.

ii. The beacon circuit according to embodiment i, wherein the communication for the subsequent communication is based on ultra wideband, UWB, while the communication channel for the beacon signal is more narrowband than UWB.

iii. The beacon circuit according to embodiment i or ii, wherein the beacon signal comprises an identity of the device of the beacon circuit.

iv. The beacon circuit according to embodiment i or ii, wherein the beacon signal comprises an indication of time of the subsequent communication.

v. The beacon circuit according to any one of the preceding embodiments, wherein the beacon signal comprises communication capabilities supported by the device of the beacon circuit.

vi. The beacon circuit according to embodiment v, wherein the capabilities comprise any one or more of supported bitrate(s), supported frequencies, supported communication protocol(s), supported communication protocol version(s).

vii. An access control device comprising the beacon circuit according to any one of embodiments i to vi.

viii. A key device comprising the beacon circuit according to any one of embodiments i to vi.

ix. The key device according to embodiment viii, wherein the key device forms part of a smartphone.

x. A method for transmitting positioning data, the method being performed in a key device and comprising the steps of:
  generating positioning data;
  protecting the positioning data, yielding protected positioning data; and
  transmitting the positioning data to an access control device.

xi. The method according to embodiment x, wherein the step of protecting the positioning data comprises encrypting the protected positioning data.

xii. The method according to embodiment xi, wherein the encrypting is based on symmetric encryption of the positioning data.

xiii. The method according to embodiment xi, wherein the encrypting is based on asymmetric encryption of the positioning data.

xiv. The method according to embodiment xi, wherein the step of protecting the positioning data comprises cryptographically signing the positioning data.

xv. A key device for transmitting positioning data, the key device comprising:
  a processor; and
  a memory storing instructions that, when executed by the processor, cause the key device to:
    generate positioning data;
    protect the positioning data, yielding protected positioning data; and
    transmit the positioning data to an access control device.

xvi. A computer program for transmitting positioning data, the computer program comprising computer program code which, when run on a key device causes the key device to:
  generate positioning data;
  protect the positioning data, yielding protected positioning data; and
  transmit the positioning data to an access control device.

xvii. A computer program product comprising a computer program according to embodiment xvi and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A beacon circuit for use with electronic locks, the beacon circuit comprising:
  a transmitter;
  wherein the beacon circuit is configured to repetitively transmit a beacon signal to initiate subsequent communication with a receiver;
  wherein the beacon signal employs a communication channel which consumes less power than a communication channel for the subsequent communication and wherein the beacon signal comprises an indication of time of the subsequent communication and a slot rate for the subsequent communication, the slot rate defining a periodicity for the subsequent communication;
  wherein the beacon signal comprises sufficient power to activate the receiver;
  wherein the beacon circuit forms part of a key device, and the receiver forms part of an access control device.

2. The beacon circuit according to claim 1, wherein the communication channel for the subsequent communication is based on ultra-wideband, UWB, while the communication channel for the beacon signal is more narrowband than UWB.

3. The beacon circuit according to claim 1, wherein the beacon signal comprises an identity of the device of the beacon circuit.

4. The beacon circuit according to claim 1, wherein the beacon signal comprises communication capabilities supported by the device of the beacon circuit.

5. The beacon circuit according to claim 4, wherein the capabilities comprise any one or more of supported bitrate(s), supported frequencies, supported communication protocol(s), or supported communication protocol version(s).

6. The beacon circuit according to claim 1, wherein the beacon signal comprises connection data that is usable for establishing the communication channel for the subsequent communication.

7. The beacon circuit according to claim 6, wherein the connection data comprises an identifier of a network to use for the communication channel for the subsequent communication.

8. The beacon circuit according to claim 6, wherein the beacon signal is encrypted.

9. The beacon circuit according to claim 8, wherein the beacon signal comprises a password for the network to use for the subsequent communication.

10. A key device comprising the beacon circuit according to claim 1.

11. The key device according to claim 10, wherein the key device forms part of a smartphone.

12. A method for providing a beacon signal, the method being performed by a beacon circuit, the method comprising:
  repetitively transmitting a beacon signal to initiate subsequent communication with a receiver;
  wherein the beacon signal employs a communication channel which consumes less power than a communication channel for the subsequent communication and wherein the beacon signal comprises an indication of time of the subsequent communication and a slot rate for the subsequent communication, the slot rate defining a periodicity for the subsequent communication;
  wherein the beacon signal comprises sufficient power to activate the receiver;
  wherein the beacon circuit forms part of a key device, and the receiver forms part of an access control device.

13. The method according to claim 12, further comprising:
  establishing the subsequent communication in correspondence with the indication of time.

14. The method according to claim 12, wherein the communication channel for the subsequent communication is based on ultra-wideband, UWB, while the communication channel for the beacon signal is more narrowband than UWB.

15. The method according to claim 12, wherein the beacon signal comprises an identity of the device of the beacon circuit.

16. The method according to claim 12, wherein the beacon signal comprises communication capabilities supported by the device of the beacon circuit.

17. The method according to claim 16, wherein the capabilities comprise any one or more of supported bitrate(s), supported frequencies, supported communication protocol(s), or supported communication protocol version(s).

18. The method according to claim 12, wherein the beacon signal comprises connection data that is usable for establishing the communication channel for the subsequent communication.

19. The method according to claim 18, wherein the connection data comprises an identifier of a network to use for the communication channel for the subsequent communication.

20. The method according to claim 18, wherein the beacon signal is encrypted.

21. The method according to claim 20, wherein the beacon signal comprises a password for the network to use for the subsequent communication.

* * * * *